Nov. 1, 1932.  L. R. HEIM  1,885,914
BEARING CONSTRUCTION
Filed Nov. 2, 1928
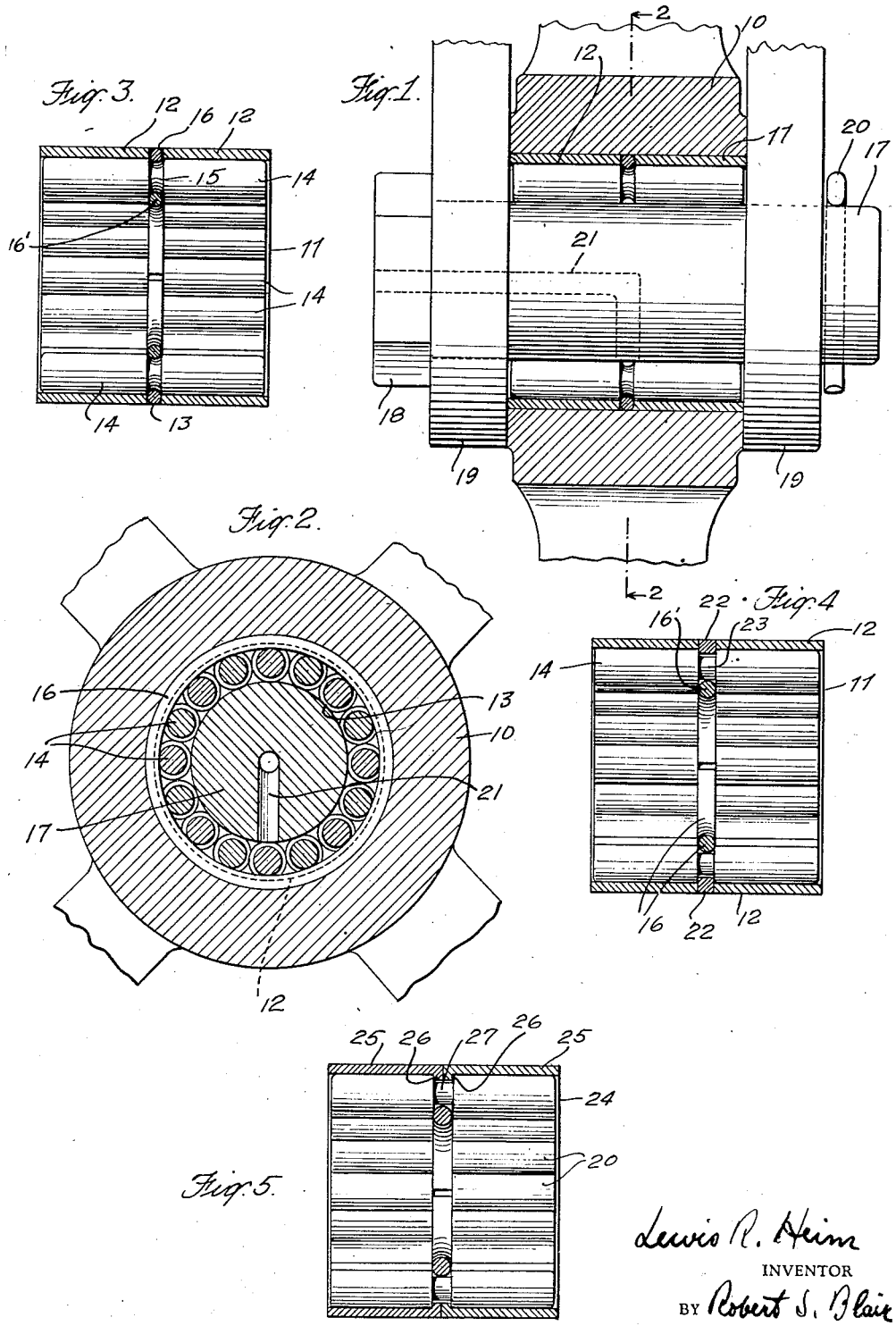

Patented Nov. 1, 1932

1,885,914

UNITED STATES PATENT OFFICE

LEWIS R. HEIM, OF DANBURY, CONNECTICUT

BEARING CONSTRUCTION

Application filed November 2, 1928. Serial No. 316,740.

This invention relates to the construction of anti-friction bearings and methods of making the same but more particularly to bearings of the roller type.

The primary objects of the invention are to provide a bearing of this type which is simple in construction and economical to produce, convenient to assemble and ship and efficient and dependable in action. Further objects are to provide at minimum cost true cylindrical bearing surfaces for the rolls, to permit replacement of these bearing surfaces in case of wear or damage and in general to provide an improved roller bearing. Other objects will be in part obvious and in part pointed out in the specification.

The invention accordingly consists in the features of construction, combination of elements, arrangement of the parts, and in the several steps and relation and order of the same, all as will be herein illustratively described and the scope of the application of which will be indicated in the following claims.

In the accompanying drawing, in which are shown the mechanical features of certain selected embodiments of this invention, Fig. 1 is a side elevation, certain parts, however, being shown in central vertical section;

Fig. 2 is a similar view taken substantially on the line 2—2 of Fig. 1;

Fig. 3 is a detailed sectional elevation of parts of the device as shown in Fig. 1;

And Figs. 4 and 5 are detailed sectional views of modified forms of the invention.

Referring now to the drawing and particularly to Figs. 1-3 inclusive there is shown an outer member 10 which may be the hub of a wheel, for example. Within this hub is a device generally indicated at 11 of a general cylindrical form which may be made of sheet metal or other suitable stock. This device as here shown comprises two tubular parts or members 12 arranged in alignment with their opposing ends in this instance spaced as at 13. These parts are preferably of relatively soft metal and subsequently hardened and for best results are ground upon their internal and external surfaces. Preferably thin stock is used as the parts are supported in action.

Within the device 11 is arranged a set of rolls 14 of suitable size for the bearing in which they are to be used. These rolls bridge the two parts 12 and are provided with an annular peripheral groove as 15 substantially midway between their ends. A ring as 16 of wire or other suitable material is interposed between the opposing ends of the parts 12 and locked in this position by such parts. The inner periphery of this ring is preferably of less diameter than the inner periphery of the parts 12 so that when the device is assembled this ring projects inwardly into the bore of the device substantially in the manner indicated. When the rolls are inserted into the device this inwardly projecting portion of the ring fits into a portion of the groove 15 of each of the rolls and prevents endwise movement of such rolls.

After the device 11 has been assembled in the manner described and the rolls have been inserted therein in their proper position a supporting member 16' in the form of a split ring, for example, is forced into the device within the rolls and snaps into the groove 15. This supporting member acts to hold the rolls in their proper position until the device is ready for final assembly in the bearing. This is a very advantageous feature as it enables the device 11 (parts 12—12 and rolls 14) to be completely assembled and either shipped or stored in this condition.

The entire device 11 with rollers and rings in place is preferably forced in an axial direction within the member 10 until it substantially registers therewith, as shown in Fig. 1 of the drawing, although it is to be understood that parts 12, 12 and 16 of the device 11 may be inserted separately and the other parts thereafter assembled therein. This hub 10 acts to further support the device thus permitting sheet metal of thin gauge to be utilized in the formation of the latter part. Furthermore, the relatively heavy rolls bridge the joint between the constituent elements 12, 12 of the device 11, thus acting to hold the parts in alignment.

Passing through the rolls and having a bearing thereon in the illustrative embodiment here shown is a short shaft or pin 17 which is headed at the end 18 and retained in position in supports 19 by a cotter pin 20 or other suitable means. These supports 19 are disposed on opposite sides of the hub 10 and would act to externally lock the device 11 against axial movement in either direction if for any reason it was insufficiently tightly held by the cylindrical inner surface of the hub. When the pulley or other device is ready to be mounted on the shaft 17, it is placed in proper position between the supports 19 and the shaft is pushed endwise through the supports and the hub and as the shaft passes through the hub it forces the ring 16' out of the device and leaves the assembly in the condition illustrated in Fig. 1. The shaft 17 now forms a bearing surface for the rolls. The ring 16 remains in the position described and continues to prevent any endwise movement of the rollers relative to the shaft or to the parts 12, 12 of the device 11.

Lubricant is conducted to the bearing by means of a passage 21 which extends axially of the shaft 17 preferably to a point substantially opposite the central interval 13 between the parts 12 and thence radially to the periphery of the shaft.

The device 11 not only makes possible the assembly of the elements of the bearing and facilitates the handling and shipping of the same but it very materially reduces the cost of production of a bearing of this type. The parts or elements 12 of the device 11 being initially formed of sheet metal may be brought to the proper size and shape at small cost and subsequent hardening and grinding is easily performed and this eliminates the necessity for accurately finishing and hardening the inner cylindrical surface of the hub 10 within which the rollers are to operate. It also permits a new bearing surface to be provided within the hub in case of wear as the old device may be readily forced out and replaced with a new one.

The embodiment shown in Fig. 4 differs from the one previously described only in that a ring as 22 substantially square in cross-section is substituted for the round wire ring 13 already described. This ring likewise fits between the opposing ends of the parts 12 of the device 11. In this case it is advisable to make the groove 23, corresponding to the groove 15 of Figure 3, likewise substantially square in cross-section so that it will closely fit about the ring. The supporting member 16' here also is in the form of a split ring of round wire but various other forms or devices for a similar purpose may be substituted therefor as will now, in view of the foregoing, be readily evident. It is immaterial whether or not the supporting member fits closely between the side walls of the groove in the rolls and in fact it is not of material importance that the member actually be located in this groove, a real advantage, however, being that the grooves act to prevent any possibility of the supporting member dropping out of the bearing as might possibly occur if the member merely acted against the cylindrical portions of the roll.

In Figure 5 is shown another embodiment of certain features of my invention. The device of this embodiment, generally indicated at 24, is also composed of two parts placed in alignment but these parts 25 are provided with an annular inwardly projecting flange 26 at one end, although a flange may be provided on only one of these members. The device differs also from the previous embodiments in that the adjacent ends of the parts 25 abut. The two flanges 26 in the assembled device together form a central inwardly projecting rib which enters the groove 27 in the rollers 28 and acts to prevent endwise movement of the rolls within the device in the same manner as the rings 16 and 22 in the previously described embodiments. By thus forming a flange on one end of each of the parts 25, no difficulty is found in stamping each of these parts from sheet metal and the subsequent grinding is not rendered more difficult than where a plain cylinder was used. In other respects the device is the same as previously described and is assembled and mounted in like manner.

It will thus be seen that there is provided a construction and an art, both of an essentially practical nature, in which the several objects of this invention are attained.

As many other embodiments may be made of the mechanical features of the above invention, and as the art herein described may be varied considerably, all without departing from the scope of the invention, it is to be understood that all matter herein set forth or shown in the accompanying drawing is to be interpreted as illustrative and not in a limiting sense.

I claim:

1. The herein described art of making an anti-friction bearing which consists in arranging a pair of tubular members in alignment with their opposing ends spaced, inserting between said opposing ends a retaining ring, forming a set of rolls each with an annular peripheral groove, inserting the rolls into position within said members with a portion of said ring lying within the groove in each of said rolls and inserting a supporting member within the set of rolls to temporarily maintain the rolls in said position.

2. In construction for anti-friction bearings, in combination, a pair of tubular members arranged in alignment, a set of rolls arranged within and bridging said members, a supporting ring inserted within said members to maintain said rolls in position therein, and ring-like means intermediate of the ends of said aligned tubular members to interlock with said rolls to prevent endwise movement thereof.

3. In construction for anti-friction bearings, in combination, a pair of tubular members arranged in alignment, a ring of less internal diameter than said members held between the opposing ends thereof, a set of rolls arranged within and bridging said members, each of said rolls being provided intermediate its ends with an annular peripheral groove into which the inner peripheral portion of said ring projects to prevent endwise movement of said rolls within said member, and a supporting member inserted within the set of rolls and acting to maintain said rolls in contact with the inner peripheral surface of said members.

4. The herein described art of making an anti-friction bearing which consists in forming sheet metal into a generally cylindrical shape, forming a set of rolls with annular peripheral grooves, disposing the rolls in position in said member, forcing a resilient ring-shaped member within the set of rolls, permitting said ring-shaped member to snap into registry with said grooves to hold said rolls in said position, and utilizing the said member to be fitted within said rolls to force said resilient member from said groove and out of said rolls as said inner member upon which said rolls are to rest is being inserted into said rolls.

5. The herein described art of making an anti-friction bearing which consists in forcing a sheet metal member into a generally cylindrical shape, hardening said sheet metal member, inserting a set of rolls in position within said member, and inserting a temporary resilient supporting ring within the set of rolls to maintain said rolls in contact with the inner surface of said member to prepare for future complete assembly, said ring adapted to be forced therefrom during final assembly.

6. The herein described art of making an anti-friction bearing which consists in arranging a pair of tubular members in alignment so that an inwardly extending flange on one of said members abuts against the adjacent end of the other member, forming a set of rolls each with an annular peripheral groove, inserting the rolls into position within said members with said flange lying within the groove in each of said rolls, and inserting a supporting member within said rolls to temporarily maintain said rolls in said position.

7. The herein described art of making an anti-friction bearing which consists in forming tubular members having inwardly extending flanges on one end thereof, arranging said tubular members with said flanges abutting, forming a set of rolls each with an annular peripheral groove, and inserting the rolls into position within said members so that said flanges are in registry with said grooves in said rolls.

8. The herein described art of making an anti-friction bearing which consists in forming tubular members having inwardly extending flanges on one end thereof, arranging said tubular members with said flanges abutting, forming a set of rolls each with an annular peripheral groove, inserting the rolls into position within said members so that said flanges are in registry with said grooves in said rolls, and inserting a supporting member within the set of rolls to temporarily maintain the rolls in said position.

9. In construction for anti-friction bearing, in combination, a pair of tubular members having inwardly extending flanges on one end thereof, said members being in substantial alignment and having said flanges abutting, and a set of rolls within and bridging said members, said rolls having annular peripheral grooves into which said flanges extend to prevent endwise movement of said rolls within said members.

10. In construction for anti-friction bearing, in combination, a pair of tubular members having inwardly extending flanges on one end thereof, said members being in substantial alignment and having said flanges abutting, a set of rolls within and bridging said members having annular peripheral grooves into which said flanges extend to prevent endwise movement of said rolls within said members, and a supporting member inserted within the set of rolls and acting to maintain said rolls in contact with the inner peripheral surface of said members.

11. An article of manufacture including, in combination, a tubular member forming an outer race for an anti-friction bearing, a set of rolls within said member, and a removable resilient supporting member temporarily inserted within said set of rolls and acting to maintain said rolls in assembled relation with respect to said tubular member prior to the final assembly of said tubular member and rolls with respect to a shaft or the like.

12. The herein described art of making an anti-friction bearing which consists in forcing a sheet metal member into a generally cylindrical shape, hardening said sheet metal member, inserting a set of rolls in position within said member, and inserting a temporary resilient supporting ring within the set of rolls to maintain said rolls in contact with the inner surface of said member to prepare for future complete asembly, said ring adapted to be forced from said rolls upon the insertion of a shaft within said rolls.

In testimony whereof, I have signed my name to this specification this 22nd day of October, 1928.

LEWIS R. HEIM.